US011332078B2

(12) United States Patent
Loren et al.

(10) Patent No.: US 11,332,078 B2
(45) Date of Patent: May 17, 2022

(54) EMBLEM DOVETAIL SNAP FEATURE

(71) Applicant: GM Global Technology Operations LLC, Detroit, MI (US)

(72) Inventors: Ellen Loren, Rochester Hills, MI (US); Kitty L. Gong, Macomb, MI (US); Robert Mayes, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 878 days.

(21) Appl. No.: 16/166,531

(22) Filed: Oct. 22, 2018

(65) Prior Publication Data

US 2020/0122647 A1  Apr. 23, 2020

(51) Int. Cl.
*B60R 13/00* (2006.01)
*F16B 21/08* (2006.01)
*F16B 5/00* (2006.01)

(52) U.S. Cl.
CPC .......... *B60R 13/005* (2013.01); *F16B 5/0052* (2013.01); *F16B 21/086* (2013.01); *F16B 21/088* (2013.01); *F16B 2200/10* (2018.08); *F16B 2200/30* (2018.08)

(58) Field of Classification Search
CPC .......... F16B 5/0052; F16B 2200/30; F16B 2200/10; F16B 21/086; F16B 21/088; B60R 13/005
USPC ........................................ 403/381
See application file for complete search history.

(56) References Cited

U.S. PATENT DOCUMENTS

| | | | | |
|---|---|---|---|---|
| 1,663,968 A | * | 3/1928 | Beckanstin | E06B 3/9845 403/381 |
| 3,603,053 A | * | 9/1971 | Van Loghem | E04B 1/6158 52/285.1 |
| 3,680,277 A | * | 8/1972 | Martin | F16B 5/0052 52/438 |
| 4,052,832 A | * | 10/1977 | Jungers | E04B 1/32 52/779 |
| 4,432,590 A | * | 2/1984 | Lawrence | A47B 47/04 108/156 |
| 4,496,260 A | * | 1/1985 | Brunn | F16B 12/125 403/189 |
| 4,652,170 A | * | 3/1987 | Lew | E04B 1/617 403/381 |
| 5,107,639 A | * | 4/1992 | Morin | E04B 1/3445 220/6 |
| 5,429,581 A | * | 7/1995 | Michaud | B04B 1/2008 494/54 |

(Continued)

FOREIGN PATENT DOCUMENTS

| | | | | |
|---|---|---|---|---|
| CH | 713416 A2 | * | 8/2018 | ........... F25D 17/067 |
| EP | 3587720 A1 | * | 1/2020 | ............. E06B 1/342 |
| FR | 2900992 A1 | * | 11/2007 | ............. B60T 17/06 |

*Primary Examiner* — Matthew R McMahon
(74) *Attorney, Agent, or Firm* — Vivacqua Crane PLLC

(57) ABSTRACT

An emblem assembly includes a body of a polymeric material. A polymeric material extending portion is homogeneously connected to the body. The extending portion has a dove-tail shaped connector outwardly and homogenously extending from the extending portion. The dove-tail shaped connector defines a V-shape having a first wing and a second wing. An attachment member includes a first recessed pocket receiving the first wing and a second recessed pocket receiving the second wing to frictionally couple the attachment member to the extending portion.

17 Claims, 5 Drawing Sheets

(56) References Cited

U.S. PATENT DOCUMENTS

| | | | | |
|---|---|---|---|---|
| 5,588,726 | A * | 12/1996 | Lee ......................... | F16B 12/02 |
| | | | | 312/263 |
| 6,176,641 | B1 * | 1/2001 | Schenk ................ | B23Q 1/0063 |
| | | | | 403/381 |
| 7,887,250 | B1 * | 2/2011 | Wang ........................ | E06B 1/18 |
| | | | | 403/381 |
| 9,032,686 | B2 * | 5/2015 | Speidel ............... | E04F 13/0894 |
| | | | | 52/591.5 |
| 9,056,441 | B2 * | 6/2015 | Ostrander ............... | B32B 15/00 |
| 2020/0036411 | A1 * | 1/2020 | Kandler ................ | B62D 1/046 |

* cited by examiner

EMBLEM DOVETAIL SNAP FEATURE

INTRODUCTION

The present disclosure relates to two-or-more piece emblems which are mounted to body panels of vehicles.

Emblem assemblies mounted to external body panels of vehicles such as automobile vehicles, trucks, vans and the like are used for example to distinguish vehicle makes and models and may also provide a distinguishing symbol unique to a vehicle make or model. Known emblem assemblies may be two-piece assemblies of one or more polymeric materials often requiring two different finishes such as a body to which a finish such as a galvano-chrome electroplating is applied and an attachment portion to which a different finish such as a paint layer is applied to visually distinguish the features of the emblem. The two-piece assembly is commonly joined using a "heat-stake" process after the different finishes are applied. The heat-stake process generally requires a pin of one piece seated in an aperture of the other piece, with heat applied to the pin to create a bond to couple the pieces. The heating process can also partially melt other areas of the components and therefore can visually degrade the appearance of the completed emblem assembly and introduce variation in fit of the parts. The heat-stake process also introduces additional cost both in part preparation and in part assembly.

Thus, while current emblem assembly construction achieves the intended purpose, there is a need for a new and improved system and method for creating and joining components of an emblem assembly.

SUMMARY

According to several aspects, an emblem assembly includes a body of a polymeric material. An extending portion of a polymeric material is connected to the body. The extending portion has a dove-tail shaped connector outwardly extending from the extending portion. An attachment member is frictionally coupled to the extending portion using the dove-tail shaped connector.

In another aspect of the present disclosure, the dove-tail shaped connector defines a V-shape, having a first wing and a second wing, the first wing angularly oriented at an angle alpha ($\alpha$) with respect to the second wing in an as-molded condition.

In another aspect of the present disclosure, the attachment member includes: a first recessed pocket shaped similar to the first wing and geometrically sized to frictionally receive the first wing; and a second recessed pocket shaped similar to the second wing and geometrically sized to frictionally receive the second wing.

In another aspect of the present disclosure, each of the first wing and the second wing provides a design interference between an installed position of the first wing within the first recessed pocket and the second wing within the second recessed pocket having a first face of the first wing in direct contact with a first wall of the first recessed pocket and a first face of the second wing in direct contact with a first wall of the second recessed pocket and an as-molded position of the first face of each of the first wing and the second wing prior to biasing the first wing to enter into the first recessed pocket and the second wing to enter into the second recessed pocket.

In another aspect of the present disclosure, when the first wing is biased into the first recess pocket and the second wing is biased into the second recessed pocket, a planar wall of the attachment member is forced into direct contact with an oppositely facing planar wall of the extending portion.

In another aspect of the present disclosure, the angle $\alpha$ ranges from approximately 20 degrees to 120 degrees inclusive.

In another aspect of the present disclosure, the extending portion is homogeneously connected to the body, with the dove-tail shaped connector homogeneously connected to the extending portion.

In another aspect of the present disclosure, the extending portion includes an extending wall; and the attachment member includes a longitudinal flange which supports the extending wall when the attachment member is frictionally coupled to the extending portion.

In another aspect of the present disclosure, the body includes a longitudinal portion; and when the attachment member is frictionally coupled to the extending portion a planar surface of the extending portion is oriented coplanar with each of a planar surface of the attachment member and a planar surface of the longitudinal portion.

In another aspect of the present disclosure, a shoulder homogeneously extends from the attachment member, the shoulder including a first flange. An extending wall of the body abuts onto the flange of the shoulder when the attachment member is frictionally coupled to the extending portion.

According to several aspects, an emblem assembly includes a body of a polymeric material. A polymeric material extending portion is homogeneously connected to the body. The extending portion has a dove-tail shaped connector outwardly and homogenously extending from the extending portion. The dove-tail shaped connector defines a V-shape having a first wing and a second wing. An attachment member includes a first recessed pocket receiving the first wing and a second recessed pocket receiving the second wing to frictionally couple the attachment member to the extending portion.

In another aspect of the present disclosure, the first wing is angularly oriented with respect to the second wing at an angle alpha ($\alpha$) in an as-molded condition.

In another aspect of the present disclosure, the first recessed pocket is angularly oriented with respect to the second recessed pocket at an angle beta ($\beta$), with the angle beta ($\beta$) being less than the angle alpha ($\alpha$) requiring the first wing and the second wing to be elastically deflected toward each other to enter the first recessed pocket and the second recessed pocket.

In another aspect of the present disclosure, a distance between an as-molded position of the first wing or the second wing required to elastically deflect the first wing into the first recessed pocket or the second wing into the second recess pocket defines a design interference.

In another aspect of the present disclosure, the design interference is approximately 0.239 mm.

In another aspect of the present disclosure, the elastic deflection of the first wing and the elastic deflection of the second wing create a biasing force of the first wing acting in opposition to a biasing force of the second wing forcing the first wing away from the second wing and forcing the attachment member toward the extending portion.

In another aspect of the present disclosure, a galvano-chrome electroplated finish is applied to the body prior to attachment of the attachment member. A paint layer is applied to the attachment member prior to attachment of the attachment member to the body.

According to several aspects, an emblem assembly includes a body of a polymeric material. A polymeric material extending portion is homogeneously connected to the body. The extending portion has multiple dove-tail shaped connectors outwardly extending from the extending portion, each of the dove-tail shaped connectors defining a V-shape having a first wing and a second wing. A galvano-chrome electroplated finish is applied to the body and to the extending portion. An attachment member of a polymeric material has multiple V-shaped recessed pockets each including a first recessed pocket receiving the first wing of one of the dove-tail shaped connectors and a second recessed pocket receiving the second wing of the one of the dove-tail shaped connectors to frictionally couple the attachment member to the extending portion. A paint layer is applied to the attachment member prior to attachment of the attachment member to the body.

In another aspect of the present disclosure, when the attachment member is frictionally coupled to the extending portion a planar surface of the extending portion is oriented coplanar with each of a planar surface of the attachment member and a planar surface of the longitudinal portion.

In another aspect of the present disclosure, a bonding member is adhesively fixed to each of the planar surface of the extending portion, the planar surface of the attachment member and the planar surface of the longitudinal portion. The bonding member is adapted to adhesively fix the emblem assembly to a surface of a vehicle body.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
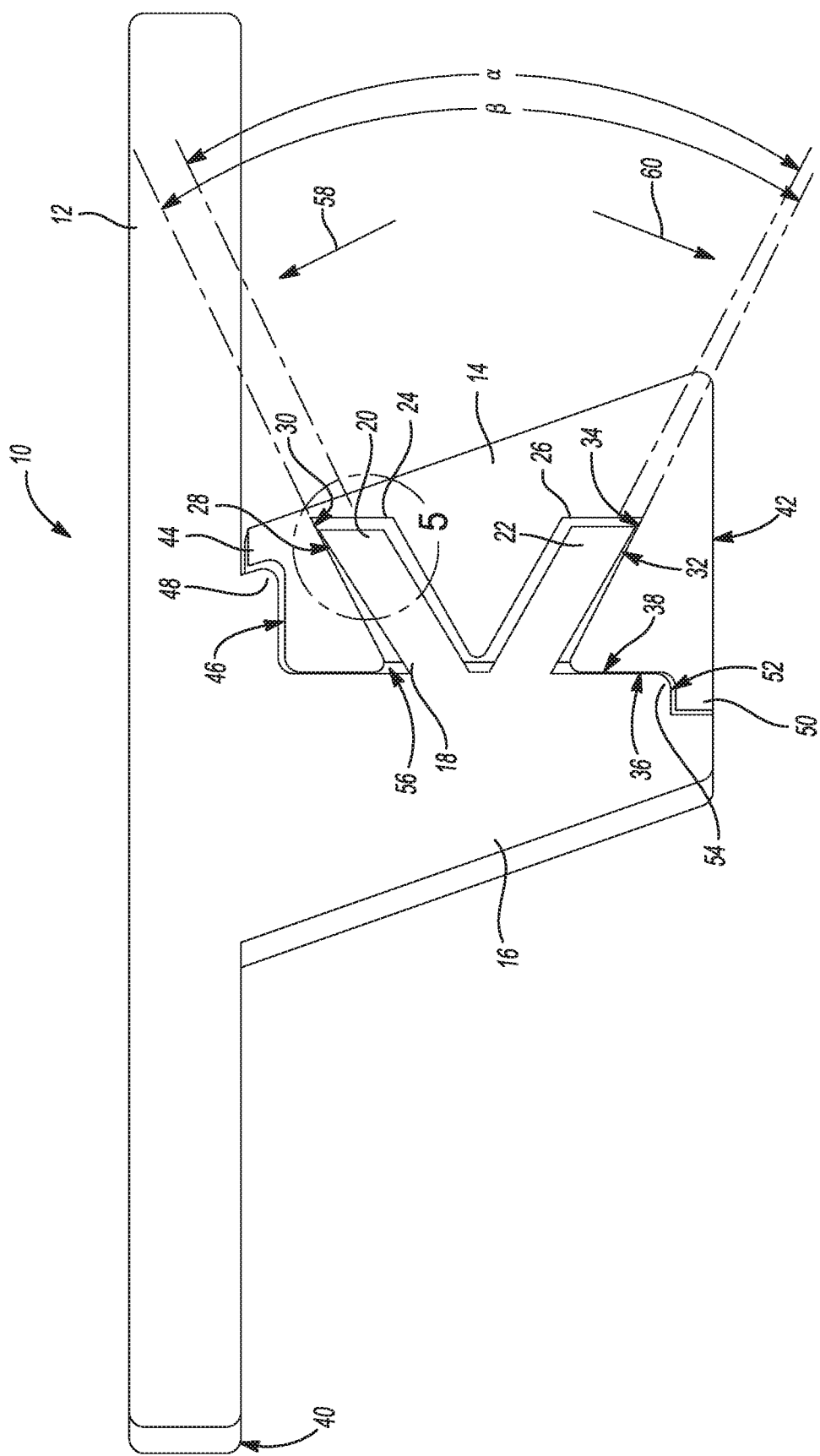
FIG. 1 is a top plan view of an emblem assembly with V-shaped snap feature according to an exemplary embodiment.

Referring to FIG. 1, an emblem assembly with V-shaped snap feature 10 includes an elongated body 12 of a molded polymeric material such as ABS having a finish such as a galvano-chrome electroplated finish applied, and a snap-on attachment member 14 also of a molded polymeric material such as Acrylonitrile Butadiene Styrene (ABS) which may be finished using a different process such as having a paint layer applied to provide any desired color for the attachment member 14. As used herein, "V-shaped" and "dove-tail shaped" are used interchangeably. The body 12 includes an extending portion 16 which is homogeneously connected to the body 12 having the attachment member 14 frictionally coupled to the extending portion 16 using at least one dove-tail shaped connector 18. According to several aspects, the dove-tail shaped connector 18 is homogeneously connected to the extending portion 16. The dove-tail shaped connector 18 substantially defines a V-shape, having a first wing 20 angularly oriented at an angle alpha ($\alpha$) with respect to a second wing 22 in an as-molded condition. According to several aspects, angle $\alpha$ is approximately 90 degrees however angle $\alpha$ can vary between approximately 20 degrees up to approximately 120 degrees at the discretion of the designer.

The attachment member 14 includes a first recessed pocket 24 which is shaped similar to the first wing 20 and geometrically sized to frictionally receive the first wing 20, and a second recessed pocket 26 which is shaped similar to the second wing 22 and which is geometrically sized to frictionally receive the second wing 22. The first wing 20 when received in the first recessed pocket 24 and the second wing 22 when received in the second recessed pocket 26 elastically deflect the first wing 20 and the second wing 22 to frictionally couple the attachment member 14 to the body 12. According to several aspects, a design interference is created by orienting the first recessed pocket 24 with respect to the second recessed pocket 26 at an angle beta ($\beta$) which is less than angle $\alpha$. In order to force the first wing 20 into the first recessed pocket 24 and the second wing 22 into the second recessed pocket 26, the first wing 20 and the second wing 22 must therefore elastically deflect toward each other creating an opposite biasing force. When biased, a first face 28 of the first wing 20 directly contacts a first wall 30 of the first recessed pocket 24, and a second face 32 of the second wing 22 directly contacts a second wall 34 of the second recessed pocket 24. With the first wing 20 and the second wing 22 biased into position as shown, a planar wall 36 of the attachment member 14 is forced into direct contact with an oppositely facing planar wall 38 of the extending portion 16.

With the attachment member 14 coupled to the extending portion 16, a planar face 40 of the body 12 (facing away from the viewer as shown in FIG. 1) and a planar face 42 of the attachment member 14 (also facing away from the viewer as shown in FIG. 1) are aligned substantially coplanar with each other. A first shoulder 44 homogeneously extending from the attachment member 14 provides a first flange 46, only partially visible in this view, onto which a first extending wall 48 of the body 12 abuts. Similarly, a second shoulder 50 homogeneously extending from the attachment member 14 provides a second flange 52 onto which a second extending wall 54 of the body 12 abuts. According to several aspects, the dove-tail shaped connector 18 is directly and homogenously connected to and extends outwardly from the second extending wall 54. The attachment member 14 also provides a longitudinal flange 56 homogeneously extending between the first flange 46 and the second flange 52 upon which the second extending wall 54 is seated and which also supports the second extending wall 54. In the assembled condition shown, a biasing force of the first wing 20 acts in a first direction 58 against the first wall 30 of the first recessed pocket 24 and a biasing force of the second wing 22 acts in a second direction 60 different from the first direction 58 against the second wall 34 of the second recessed pocket 26 to mechanically and frictionally lock the attachment member 14 onto the body 12.

Referring to FIG. 2 and again to FIG. 1, a body 62 is modified from the body 12 and includes a longitudinal portion 64 homogeneously connected to an extending portion 66. The extending portion 66 is modified from the extending portion 16 and includes multiple dove-tail shaped connectors including a first dove-tail shaped connector 68 and a second dove-tail shaped connector 70, both functionally and geometrically similar to the dove-tail shaped connector 18. The first dove-tail shaped connector 68 includes opposed wings 68', 68" and the second dove-tail shaped connector 70 includes opposed wings 70', 70". It should be evident that a quantity of the dove-tail shaped connectors can also be increased to any desired quantity by increasing a length of an extending wall 72 of the extending portion 66.

Figure 2:
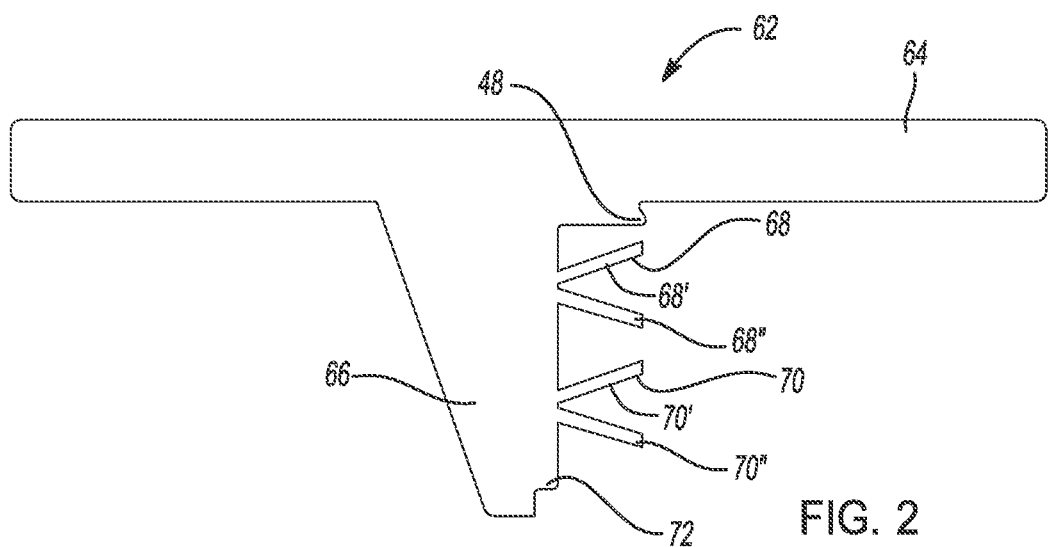
FIG. 2 is a top plan view of a body for an emblem of another aspect.

Referring to FIG. 3 and again to FIG. 2, an attachment member 74 is modified from the attachment member 14 to include each of a first V-shaped pocket 78 which is configured to receive the first dove-tail shaped connector 68 and a second V-shaped pocket 80 which is configured to receive the second dove-tail shaped connector 70. The opposed wings 68', 68" and 70', 70" of each of the first dove-tail shaped connector 68 and the second dove-tail shaped connector 70 are configured and function similarly with respect to the first wing 20 and the second wing 22 described in reference to FIG. 1. The first V-shaped pocket 78 and the second V-shaped pocket 80 define recesses formed into a planar face 82 of the attachment member 74. A first slot 84 formed within the planar face 82 defines a first flange 86 similar to the first flange 46, and a second slot 90 formed within the planar face 82 to a same depth as the first slot 84 defines a second flange 92 functioning similar to the second flange 52 and the longitudinal flange 56 described in reference to FIG. 1.

Figure 3:
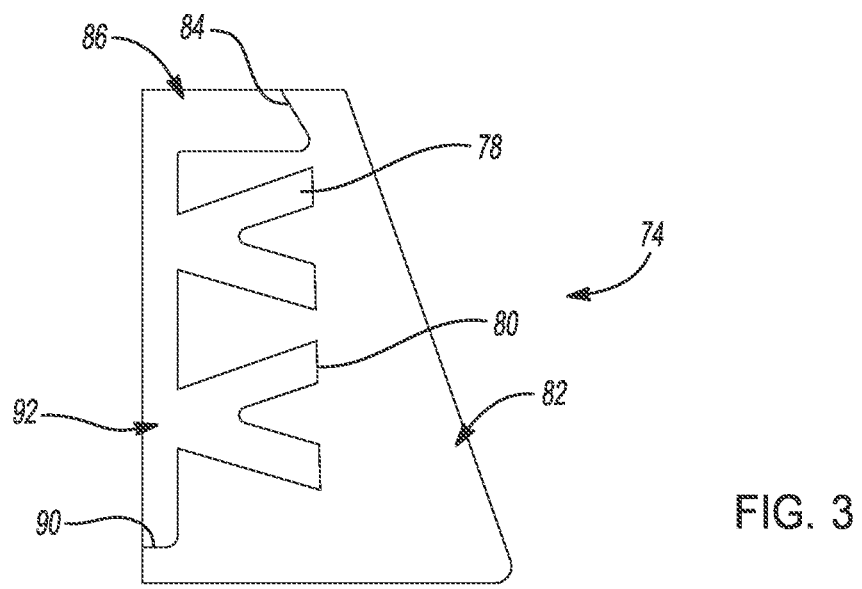
FIG. 3 is a top plan view of an attachment member shown prior to attachment to the body of FIG. 2.

Referring to FIG. 4 and again to FIGS. 2 and 3, an emblem assembly with V-shaped snap features 94 is modified from the emblem assembly with V-shaped snap feature 10 by the inclusion of the first dove-tail shaped connector 68 and the second dove-tail shaped connector 70 which are individually received in one of the first V-shaped pocket 78 and the second V-shaped pocket 80. According to several aspects, a finish coat such as a galvano-chrome electroplated finish is applied to the body 62 and a finish coat such as a paint coat is applied to the attachment member 74 prior to assembly of the emblem assembly with V-shaped snap features 94.

Referring to FIG. 5 and again to FIGS. 1 through 4, each wing such as the first wing 20 shown is designed and molded to provide a design interference 96 between the installed position of the first wing 20 within the first recessed pocket 24 having for example the first face 28 in direct contact with the first wall 30 of the first recessed pocket 24, and an as-molded position of a first face 28' prior to biasing the wing to enter into the first recessed pocket 24. According to several aspects, the design interference 96 is approximately 0.239 mm, however this value can be varied depending on the angle between wing pairs such as the angle α, the angle between pocket pairs such as the angle β, the material applied as the finish coating of the components of the assembly, and a total quantity of the dove-tail shaped connectors. For example, an additional value of approximately 0.058 mm can be added to the design interference 96 to accommodate a chrome plating thickness.

Figure 4:
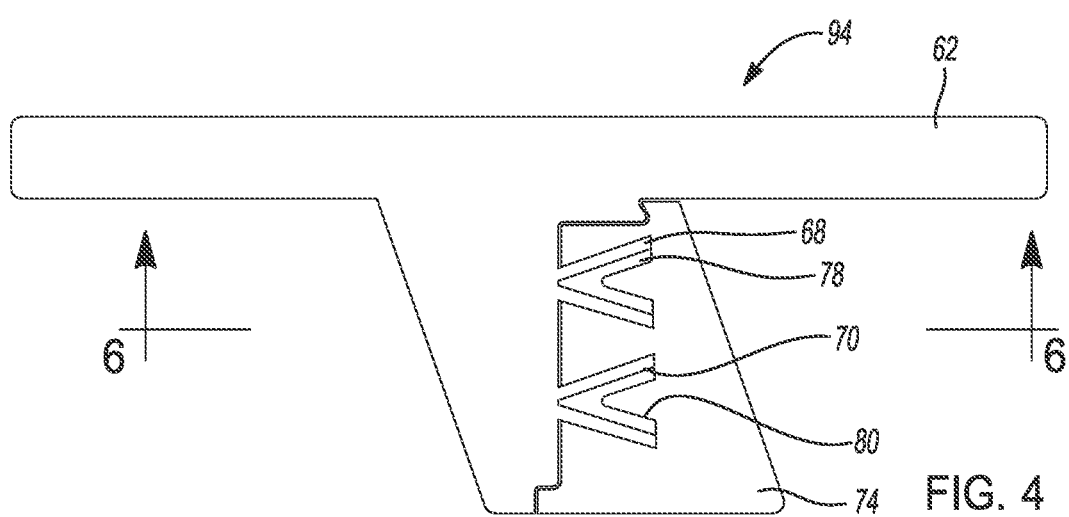
FIG. 4 is a top plan view of an emblem assembly having the body of FIG. 2 and the attachment member of FIG. 3 in an assembled condition.
Figure 5:
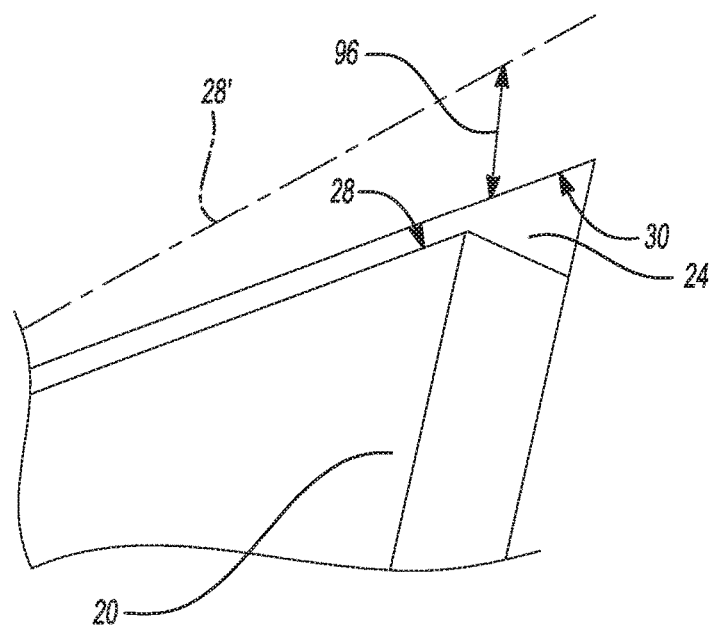
FIG. 5 is a top perspective view of area 5 of FIG. 1.
Figure 6:
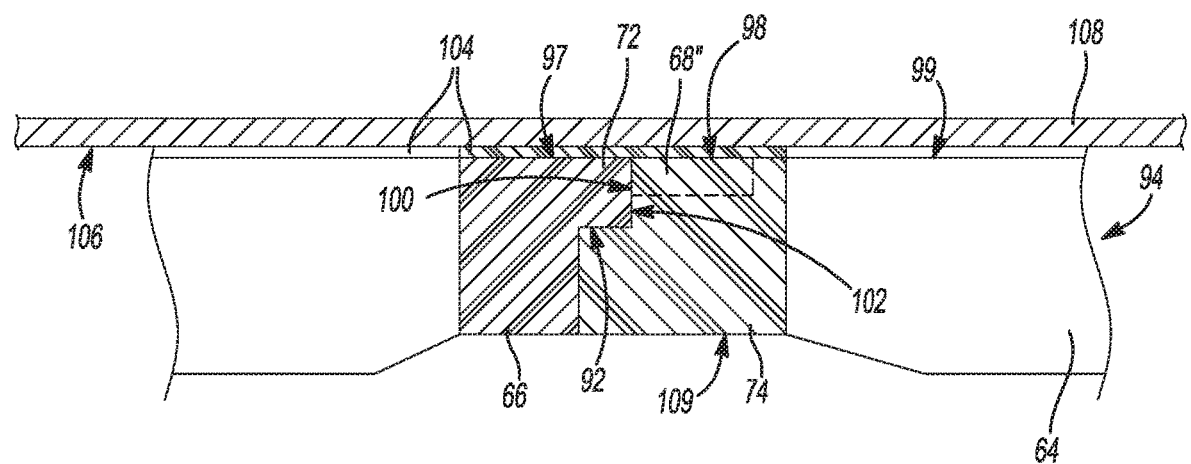
FIG. 6 is a cross-sectional front elevational view taken at section 6 of FIG. 4.

Referring to FIG. 6 and again to FIGS. 1 through 4, an exemplary installed condition of the emblem assembly with V-shaped snap features 94 has the extending portion 66 frictionally coupled to the attachment member 74 at the second flange 92 with the biasing force provided by the first dove-tail shaped connector 68 and the second dove-tail shaped connector 70 shown and described in reference to FIGS. 2 through 4 retaining the attachment member 74 in contact with the extending portion 66. In this retained condition, a planar surface 97 of the extending portion 66 is oriented coplanar with each of a planar surface 98 of the attachment member 74 and a planar surface 99 of the longitudinal portion 64. Similar to the emblem assembly with V-shaped snap features 10, with the opposed wings 68', 68" and 70', 70" of each of the first dove-tail shaped connector 68 and the second dove-tail shaped connector 70 biased into position within the pockets of the attachment member 74 as shown for the wing 68", a planar wall 100 of the attachment member 74 is forced into direct contact with an oppositely facing planar wall 102 of the extending portion 66.

A bonding member 104 such as a section of two-sided adhesive tape is adhesively fixed to each of the planar surface 97, the planar surface 98 and the planar surface 99. The bonding member 104 is then adhesively fixed to a surface 106 of a vehicle body 108 to fix the emblem assembly with V-shaped snap features 94 to the vehicle body 108. The first dove-tail shaped connector 68 and the second dove-tail shaped connector 70 are each homogenously connected to and extend outwardly away from the planar wall 102 of the extending portion 66. The opposed wings 68', 68" and 70', 70" of each of the first dove-tail shaped connector 68 and the second dove-tail shaped connector 70, including the wing 68" shown face upwardly as viewed in FIG. 6 and directly abut against the bonding member 104, therefore the opposed wings 68', 68" and 70', 70" are not visible from an outwardly directed finish side 109 of the emblem assembly with V-shaped snap features 94.

Figure 7:
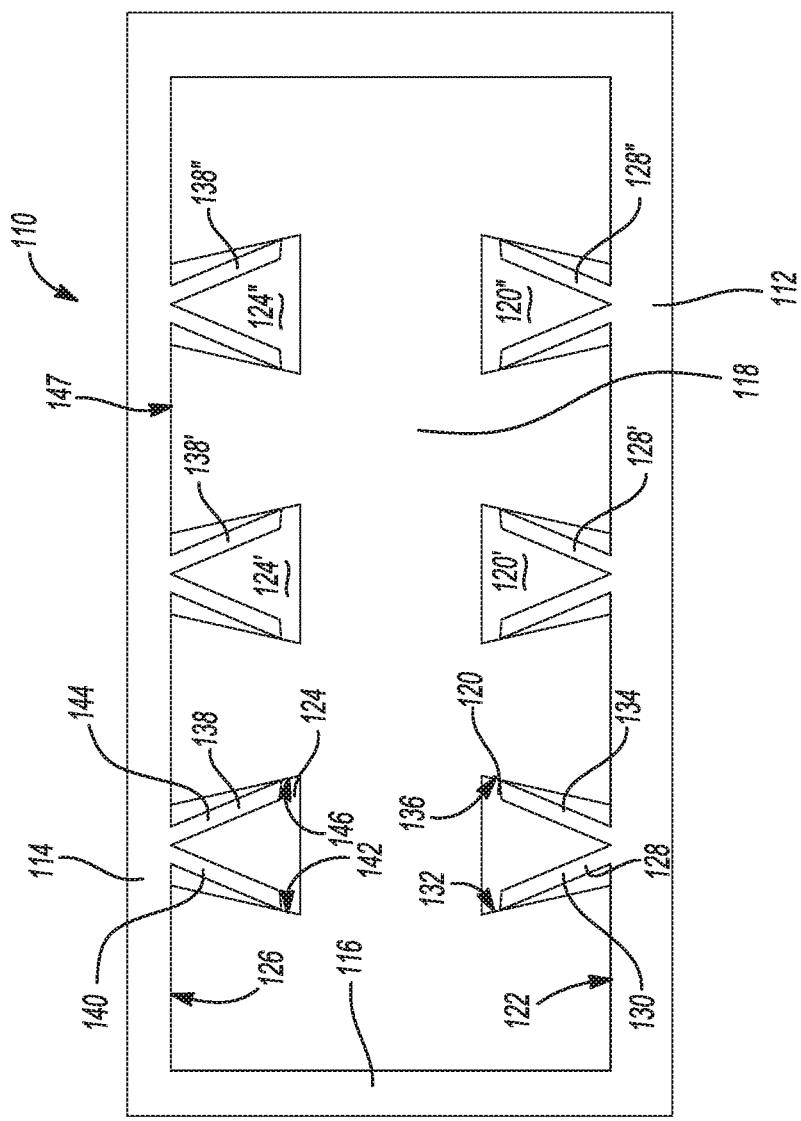
FIG. 7 is a top plan view of an emblem of another aspect.

Referring to FIG. 7 and again to FIGS. 1 through 4, an emblem assembly with V-shaped snap features 110 provides a first wall 112 which is oppositely positioned with respect to a second wall 114 of a polymeric material body 116. In place of an externally retained member such as the attachment member 74 previously described herein, an attachment member 118 is coupled and frictionally retained within and between the first wall 112 and the second wall 114 using multiple oppositely directed dove-tail shaped connectors. The attachment member 118 includes multiple conical-shaped cavities such as a cavity 120, a cavity 120' and a cavity 120" each having a large aperture directed toward the opposite second wall 114 and a small aperture size opening against an inner wall surface 122 of the first wall 112. The attachment member 118 further includes multiple conical-shaped cavities such as a cavity 124, a cavity 124' and a cavity 124" each oppositely positioned and oppositely directed with respect to one of the cavity 120, the cavity 120' and the cavity 120". Each of the cavities 124, 124' and 124" have a large aperture directed toward the opposite first wall 112 and a small aperture size opening against an inner wall surface 126 of the second wall 114. Each of the cavities of the attachment member 118 define at least recessed cavities and may further be through apertures.

A first dove-tail shaped connector 128, a second dove-tail shaped connector 128', and a third dove-tail shaped connector 128" are each homogeneously formed with the first wall 112 and extend into one of the cavity 124, the cavity 124' or the cavity 124" when the attachment member 118 is in an installed position shown. Similarly, a fourth dove-tail shaped connector 138, a fifth dove-tail shaped connector 138', and a sixth dove-tail shaped connector 138" are each homogeneously formed with the second wall 114 and extend into one of the cavity 124, the cavity 124' or the cavity 124". Each of the dove-tail shaped connectors includes opposed first and second wings. For example, the first dove-tail shaped connector 128 includes a first wing 130 which is biased against a first wall 132 of the cavity 120 and a second wing 134 which is biased against a second wall 136 of the cavity 120. Similarly, but oriented in an opposed direction, the fourth dove-tail shaped connector 138 includes a first wing 140 which is biased against a first wall 142 of the cavity 124 and a second wing 144 which is biased against a second wall 146 of the cavity 124. In the installed position of the attachment member 118, the attachment member 118 is coupled to the body 116 within a cavity 147 defined by and positioned between the first wall 112 and the second wall 114 of the body 116.

Figure 8:
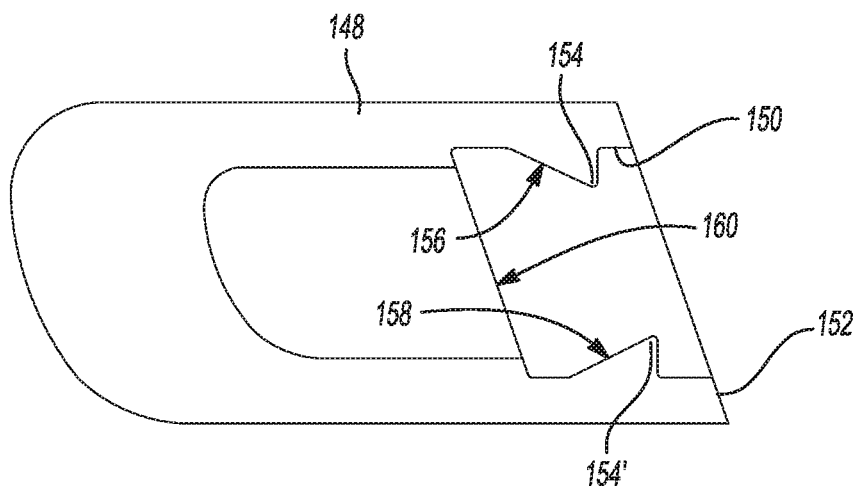
FIG. 8 is a top plan view of an emblem body according to another aspect.

Referring to FIG. 8, according to further aspects, emblem assemblies with V-shaped snap features of the present disclosure can be provided in any desired geometric shape or shape of an alphabet letter. For example, a body 148 generally defines a "D"-shape. The body 148 is provided of an injection molded polymeric material such as ABS having a finish such as a galvano-chrome electroplated finish applied and includes a cavity 150 opening at a first end 152 of the body 148. Extending into the cavity 150 are opposed engagement tabs 154, 154' each having an angularly oriented wall 156, 158. The cavity 150 ends at a cavity end face 160.

Referring to FIG. 9 and again to FIG. 8, an attachment member 162 is provided of an injection molded polymeric material such as ABS having a finish such as a paint film applied. The attachment member 162 is sized to be frictionally coupled within the cavity 150 of the body 148 described in reference to FIG. 8. The attachment member 162 includes a base 164 having opposed angular recesses 166, 166'. A base end portion 168 has an end face 170. A first wing 172 is created proximate to the recess 166 and a second wing 174 is created proximate to the recess 166'.

Figure 9:
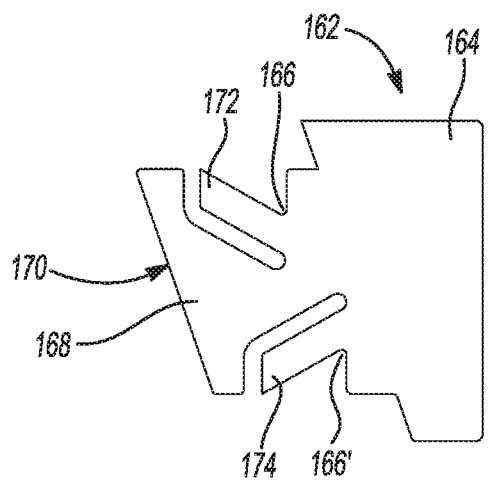
FIG. 9 is a top plan view of an emblem attachment member adapted for assembly with the body of FIG. 8.
Figure 10:
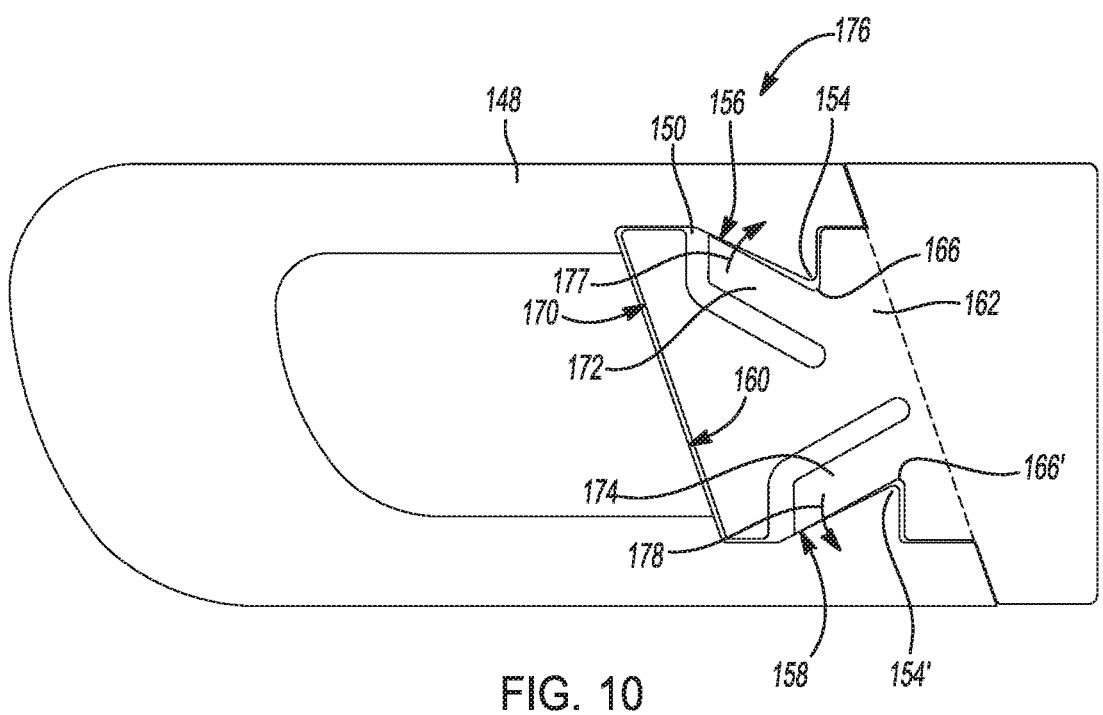
FIG. 10 is a top plan view of an emblem assembly having the body of FIG. 8 and the attachment member of FIG. 9 in an assembled condition.

Referring to FIG. 10 and again to FIGS. 8 through 9, an emblem assembly with V-shaped snap features 176 is created by frictionally coupling the attachment member 162 into the cavity 150 of the body 148. The engagement tab 154 is received in the correspondingly shaped angular recess 166 and the engagement tab 154' is received in the correspondingly shaped angular recess 166'. The first wing 172 as-molded provides a design interference such that the first wing 172 elastically deflects toward the base end portion 168 creating a biasing force retaining direct contact between the first wing 172 and the angularly oriented wall 156 acting in a biasing direction 177. Similarly, but in a generally opposite direction, the second wing 174 as-molded provides a design interference such that the second wing 174 elastically deflects toward the base end portion 168 creating a biasing force retaining direct contact between the second wing 174 and the angularly oriented wall 158 acting in a biasing direction 178. To preclude interference, the end face 170 in the installed position of the attachment member 162 is spaced away from the cavity end face 160 of the body 148.

An emblem assembly with V-shaped snap features of the present disclosure offers several advantages. These include provision of one or more dove-tail shaped connectors extending homogeneously from a body which pull an attachment member into direct contact with the body and retain the direct contact. An adhesive member can then be applied to both the body and the attachment member to adhesively couple the body and the attachment member to a body panel of a vehicle. An emblem assembly with V-shaped snap features of the present disclosure also incorporates design interference for the dove-tail shaped connectors with and without a further coating or finish layer such as a galvano-chrome electroplated finish applied to the body including to the dove-tail shaped connectors and a different finish such as a paint layer applied to the attachment member.

As used herein, the term "homogeneous" or "homogeneously" refers to two or more parts or features of a component or member that are integrally connected to each other and share the same chemical and mechanical properties. Generally the two or more homogenous parts or features are formed at the same time, for example using a single molding shot during a molding operation such as an injection molding operation.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An emblem assembly for attachment to a surface of a vehicle body, the emblem assembly comprising:
   a body of a polymeric material, the body having a longitudinal portion;
   an extending portion of a polymeric material connected to the body, the extending portion having a dove-tail shaped connector outwardly extending from the extending portion;
   an attachment member frictionally coupled to the extending portion using the dove-tail shaped connector, wherein when the attachment member is frictionally coupled to the extending portion, a planar surface of the extending portion is oriented coplanar with each of a planar surface of the attachment member and a planar surface of the longitudinal portion of the body; and
   a bonding member adhesively fixed to each of the planar surface of the longitudinal portion of the body, the planar surface of the extending portion, and the planar surface of the attachment member, the bonding member adapted to adhesively fix the emblem assembly to the surface of the vehicle body.

2. The emblem assembly of claim 1, wherein the dove-tail shaped connector defines a V-shape, having a first wing and a second wing, the first wing angularly oriented at an angle alpha (α) with respect to the second wing in an as-molded condition.

3. The emblem assembly of claim 2, wherein the attachment member includes:
   a first recessed pocket shaped similar to the first wing and geometrically sized to frictionally receive the first wing; and
   a second recessed pocket shaped similar to the second wing and geometrically sized to frictionally receive the second wing.

4. The emblem assembly of claim 3, wherein each of the first wing and the second wing provides a design interference between an installed position of the first wing within the first recessed pocket and the second wing within the second recessed pocket having a first face of the first wing in direct contact with a first wall of the first recessed pocket and a first face of the second wing in direct contact with a first wall of the second recessed pocket and an as-molded position of the first face of each of the first wing and the second wing prior to biasing the first wing to enter into the first recessed pocket and the second wing to enter into the second recessed pocket.

5. The emblem assembly of claim 3, wherein when the first wing is biased into the first recess pocket and the second wing is biased into the second recessed pocket, a planar wall of the attachment member is forced into direct contact with an oppositely facing planar wall of the extending portion.

6. The emblem assembly of claim 2, wherein the angle alpha ($\alpha$) ranges from approximately 20 degrees to 120 degrees inclusive.

7. The emblem assembly of claim 1, wherein the extending portion is homogeneously connected to the body, with the dove-tail shaped connector homogeneously connected to the extending portion.

8. The emblem assembly of claim 7, wherein:
the extending portion includes an extending wall; and
the attachment member includes a longitudinal flange which supports the extending wall when the attachment member is frictionally coupled to the extending portion.

9. The emblem assembly of claim 1, further including:
a shoulder homogeneously extending from the attachment member, the shoulder including a first flange; and
an extending wall of the body abutting onto the first flange of the shoulder when the attachment member is frictionally coupled to the extending portion.

10. An emblem assembly for attachment to a surface of a vehicle body, the emblem assembly comprising:
a body of a polymeric material, the body having a longitudinal portion;
a polymeric material extending portion homogeneously connected to the body, the extending portion having a dove-tail shaped connector outwardly and homogenously extending from the extending portion, the dove-tail shaped connector defining a V-shape having a first wing and a second wing;
an attachment member having a first recessed pocket receiving the first wing and a second recessed pocket receiving the second wing to frictionally couple the attachment member to the extending portion, wherein when the attachment member is frictionally coupled to the extending portion, a planar surface of the extending portion is oriented coplanar with each of a planar surface of the attachment member and a planar surface of the longitudinal portion of the body; and
a bonding member adhesively fixed to each of the planar surface of the longitudinal portion of the body, the planar surface of the extending portion, and the planar surface of the attachment member, the bonding member adapted to adhesively fix the emblem assembly to the surface of the vehicle body.

11. The emblem assembly of claim 10, wherein the first wing is angularly oriented with respect to the second wing at an angle alpha ($\alpha$) in an as-molded condition.

12. The emblem assembly of claim 11, wherein the first recessed pocket is angularly oriented with respect to the second recessed pocket at an angle beta ($\beta$), with the angle beta ($\beta$) being less than the angle alpha ($\alpha$) requiring the first wing and the second wing to be elastically deflected toward each other to enter the first recessed pocket and the second recessed pocket.

13. The emblem assembly of claim 12, wherein a distance between an as-molded position of the first wing or the second wing required to elastically deflect the first wing into the first recessed pocket or the second wing into the second recessed pocket defines a design interference.

14. The emblem assembly of claim 13, wherein the design interference is approximately 0.239 mm.

15. The emblem assembly of claim 12, wherein the elastic deflection of the first wing and the elastic deflection of the second wing create a biasing force of the first wing acting in opposition to a biasing force of the second wing forcing the first wing away from the second wing and forcing the attachment member toward the extending portion.

16. The emblem assembly of claim 11, further including:
a galvano-chrome electroplated finish applied to the body prior to attachment of the attachment member; and
a paint layer applied to the attachment member prior to attachment of the attachment member to the body.

17. An emblem assembly, comprising:
a body of a polymeric material;
a polymeric material extending portion homogeneously connected to the body, the extending portion having multiple dove-tail shaped connectors outwardly extending from the extending portion, each of the dove-tail shaped connectors defining a V-shape having a first wing and a second wing;
a galvano-chrome electroplated finish applied to the body and to the extending portion;
an attachment member of a polymeric material having multiple V-shaped recessed pockets each including a first recessed pocket receiving the first wing of one of the dove-tail shaped connectors and a second recessed pocket receiving the second wing of the one of the dove-tail shaped connectors to frictionally couple the attachment member to the extending portion, wherein when the attachment member is frictionally coupled to the extending portion and a planar surface of the extending portion is oriented coplanar with each of a planar surface of the attachment member and a planar surface of a longitudinal portion of the body;
a paint layer applied to the attachment member prior to attachment of the attachment member to the body; and
a bonding member adhesively fixed to each of the planar surface of the extending portion, the planar surface of the attachment member and the planar surface of the longitudinal portion of the body, the bonding member adapted to adhesively fix the emblem assembly to a surface of a vehicle body.

* * * * *